G. J. HAGAN AND J. M. HOPWOOD.
HEATING FURNACE.
APPLICATION FILED OCT. 14, 1918.

1,362,296.

Patented Dec. 14, 1920.
7 SHEETS—SHEET 3.

WITNESSES
J. Herbert Bradley.

INVENTOR
George J. Hagan
John M. Hopwood
by Damon S Wolcott
atty

G. J. HAGAN AND J. M. HOPWOOD.
HEATING FURNACE.
APPLICATION FILED OCT. 14, 1918.

1,362,296.

Patented Dec. 14, 1920.

WITNESSES

J. Herbert Bradley.

INVENTOR

George J. Hagan and
John M. Hopwood
by Hanna & Wolcott
atty

G. J. HAGAN AND J. M. HOPWOOD.
HEATING FURNACE.
APPLICATION FILED OCT. 14, 1918.

1,362,296.

Patented Dec. 14, 1920.
7 SHEETS—SHEET 5.

G. J. HAGAN AND J. M. HOPWOOD.
HEATING FURNACE.
APPLICATION FILED OCT. 14, 1918.

1,362,296.

Patented Dec. 14, 1920.
7 SHEETS—SHEET 7.

UNITED STATES PATENT OFFICE.

GEORGE J. HAGAN, OF PITTSBURGH, AND JOHN M. HOPWOOD, OF DORMONT, PENNSYLVANIA.

HEATING-FURNACE.

1,362,296.   Specification of Letters Patent.   Patented Dec. 14, 1920.

Application filed October 14, 1918. Serial No. 258,035.

*To all whom it may concern:*

Be it known that we, GEORGE J. HAGAN and JOHN M. HOPWOOD, residing at Pittsburgh and Dormont, respectively, in the county of Allegheny and State of Pennsylvania, citizens of the United States, have invented or discovered certain new and useful Improvements in Heating-Furnaces, of which improvements the following is a specification.

In the accompanying drawings forming a part of this specification

The invention described herein relates to a form of heating furnace for progressively and uniformly heating ingots of considerable size especially of the form or shape employed in the manufacture of large projectiles and has for its object the provision of a surface having a circular bed adapted to be shifted whereby the articles carried by the bed are subjected initially to a comparatively low heat progressively to a gradually increasing heat which at or adjacent to the point of discharge shall at least equal the desired working temperature. The rate of movement of the bed and the temperature at different points should be so related that the heat shall penetrate uniformly through the mass of metal, so as to avoid all liability of cracks or other injury which unequal heating will produce in some grades or alloys of metal. The invention is hereinafter more fully described and claimed.

In the practice of the invention the heating chamber is formed by inner and outer walls 1 and 2 formed on arcs of circles and spaced a suitable distance apart dependent upon the character and size of the articles to be heated. While the inner and outer walls may be continuous it will be preferable in many cases that the side walls should be less than 360 degrees in length so that there will be a gap or open space, such gap or opening being intermediate of the point at which the article is charged and that at which the article is removed from the furnace. The bottom of the heating chamber consists of a plurality of sections each consisting of a metal frame 3 supporting a block of refactory material on which the article to be heated is placed. In order to prevent injury to these blocks in charging and removing heavy articles, they are provided with cushions consisting of powdered dolomite or other suitable material which will not fuse or harden at the temperatures employed in the furnace. Sections of rails 4 are secured to the under sides of the metal frames and adjacent ends of these sections are connected by spliced joints 5 in such manner as will permit of the elongation or contraction of the rails with changes of temperature without distorting their contour or shape. The outer rails rest upon pulleys 6 mounted in suitable bearings secured to supporting beams 7, while the inner rails are supported by grooved rollers 8, a suitable number of these rollers being mounted in suitable bearings formed on blocks 9 arranged within guiding cups 10 and supported by suitable springs 11 intermediate the cups and the blocks 9 so as to hold the grooved rollers in frictional engagement with the rails at all times. The spring supported grooved rollers have one of their journals 12ª extended into the area within the furnace and connected to motors 12, preferably reversible and preferably electric, which are adapted to impart any desired rate of movement to the sectional bed.

Figure 5:
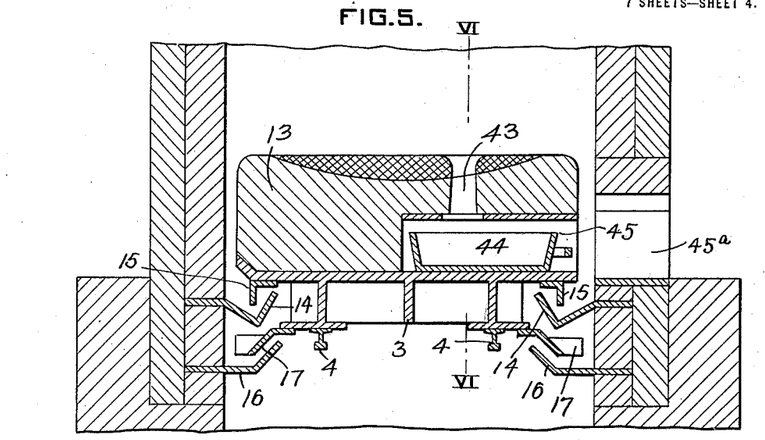
Fig. 5 is a transverse section of a furnace on a plane indicated by the line V—V, Fig. 1.
Figure 6:
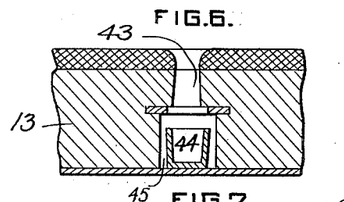
Fig. 6 is a sectional detail view on a plane indicated by the line VI—VI, Fig. 5.
Figure 8:
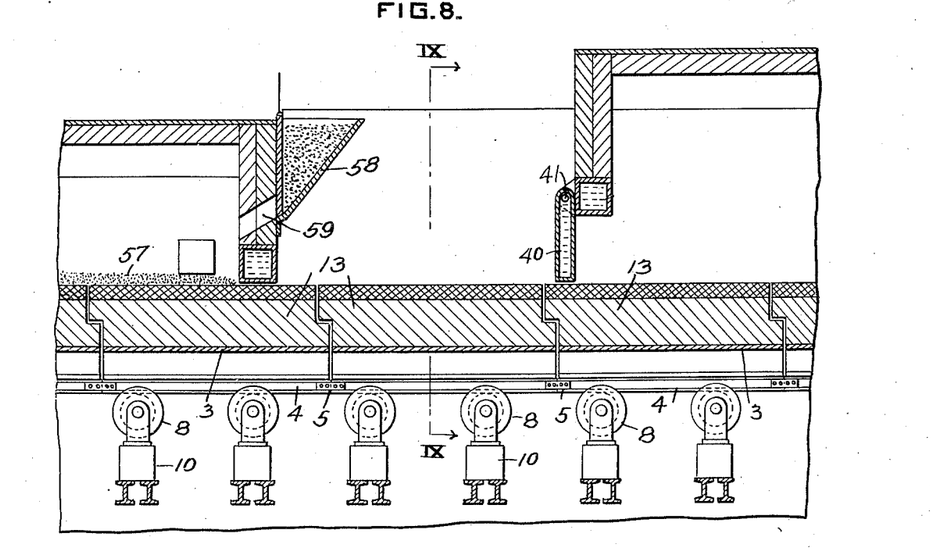
Fig. 8 is a sectional elevation on a plane indicated by the line VIII—VIII, Fig. 1.
Figure 9:
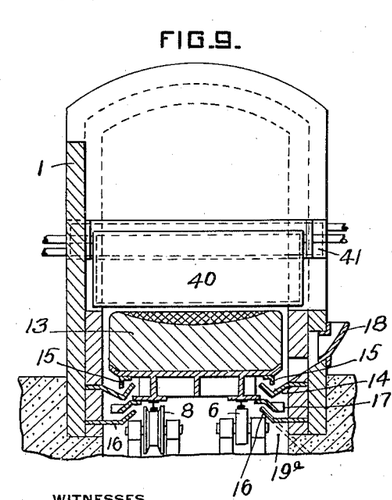
Fig. 9 is a transverse section on a plane indicated by the line IX—IX, Fig. 8.

As shown in Fig 8, the adjacent ends of the refractory blocks 13, forming the beds of the hearth sections, are constructed as to overlap or otherwise so constructed as to prevent the flow of cooling currents into the heating chamber and also to protect the metal portions of the cars from heat or dirt. As shown in Fig. 5, the widths of the blocks 13 are made somewhat less than the distance between the inner surfaces of the walls of the furnace and in order to prevent the currents of cold air from flowing up or the highly heated gases from flowing down between these furnace walls and the edges of the bocks, V-shaped troughs 14 are so supported by the walls of the furnace as to extend in under the cars which are provided with flanges 15 adapted to project down into suitable sealing material placed within the troughs. This sealing material may be sand or water or other suitable material known in the art adapted to prevent flow of currents of cold air or hot gases into or from the heating chambers. As in the operation of the furnace, sand may be forced over the inner edges of the sealing trough 14; an auxiliary or receiving trough 16 is arranged below the sealing trough to receive such sand and scrapers 17 are provided on one or more of the cars to push the sealing material to openings 18 arranged at suitable intervals for the removal of the sand collected in the receiving troughs and re-charging it into the sealing troughs through chutes 19 preferably arranged above the openings 18 through which the sand is removed from the receiving trough, as clearly shown in Figs. 2 and 9.

In order to insure the proper placing of the ingots or other articles in the furnace, an adjustable stop 20 is arranged in line with the charging opening door and suitable connections extend from the door 21 of such opening or its operating mechanism, to move the stop 20 inwardly when the door is raised and to move it back out of contact with the articles when the charging door is closed. In the construction shown in Figs. 3 and 4, the piston of the fluid pressure cylinder 22 is connected by a wire rope 22ª passing over guide pulleys to the door 21 so that by the shifting of the piston on the operation of the valve mechanism 23, the door can be raised or lowered. This valve mechanism which is connected to suitable source of fluid under pressure, is also connected by pipes 24 to opposite ends of the fluid pressure cylinder 25 which has its piston connected to the adjustable stop block 20, as shown in Fig. 4 and the several parts are so adjusted that when the valve is operated to raise the door, fluid pressure will be admitted into the cylinder operating the stop, thereby shifting the latter to such a point that its inner end will be at the point where the forward end of the article being charged is to be located. After the article has been charged the valve mechanism 23 is operated to lower the door and at the same time to withdraw the stop out of contact with the ingot and preferably entirely out of the furnace.

Figure 3:
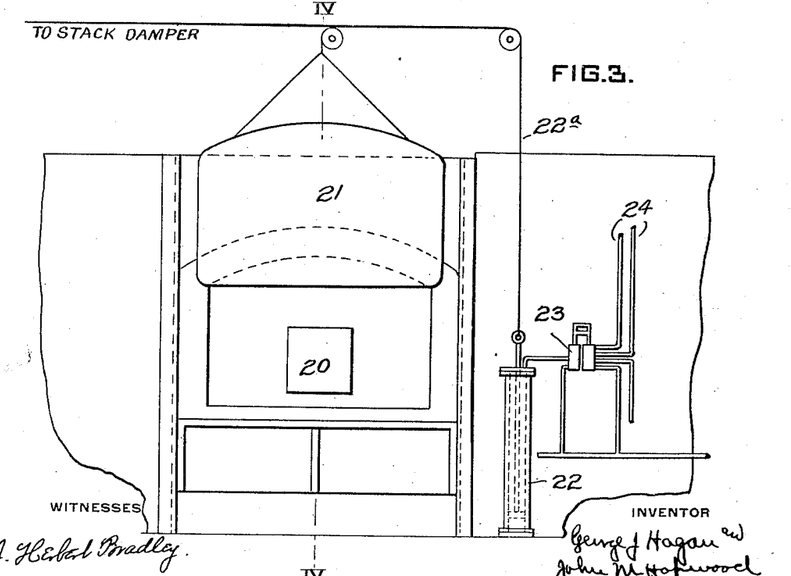
Fig. 3 is an elevation showing the charging door and a form of operating mechanism.
Figure 4:
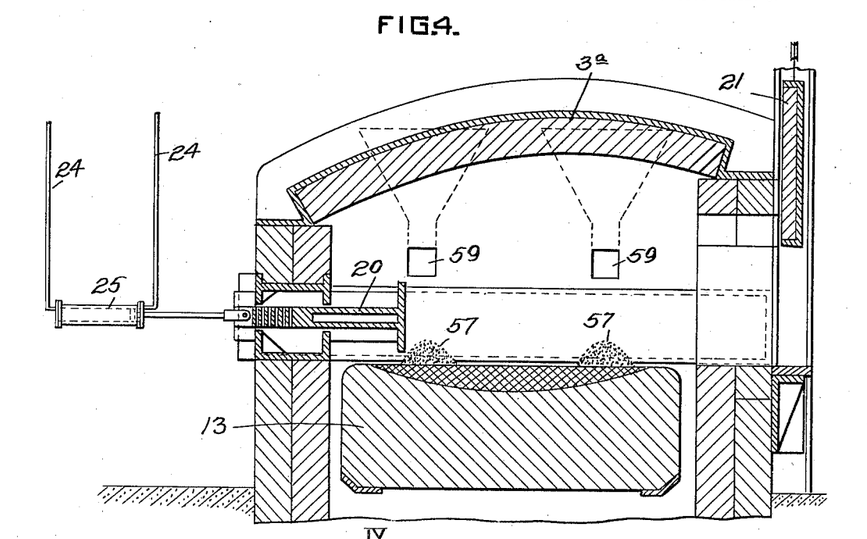
Fig. 4 is a sectional view on the line IV—IV, Fig. 3.
Figure 7:
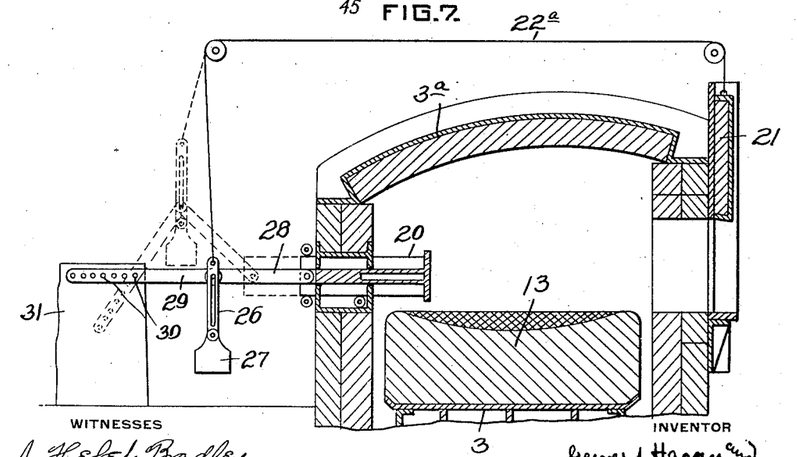
Fig. 7 is a view similar to Fig. 4 illustrating a modification of the mechanism employed for operating the charging door and the stop in line therewith.

In lieu of mechanism shown in Figs. 3 and 4, that shown in Fig. 7 may be employed for shifting the adjustable stop 20. As shown therein the charging door 21 is connected by a wire rope 22 passing over suitable guide pulleys to an end of a bar 26 the lower end of which is connected to a weight 27 sufficient not only to counterbalance the door but also to shift the adjustable stop. The shifting mechanism consists of a link 28 having one end connected to the inner end of the stop 20 while the opposite end is pivotally connected to the bar 26 carrying the weight and also to another link 29 which is pivotally connected to an abutment consisting of a pin 30 passing through the link and into one of the openings formed in a fixed block 31. As the door is raised by hand or otherwise, the weight will so shift the toggle consisting of the links 28 and 29 as to move the stop inwardly as before described and as soon as the door is moved down the movement of the toggle will be reversed and the stop will be withdrawn. As shown, the link 29 and the block 31 are provided with a plurality of holes permitting of the shifting of the pin to vary the movement of the adjustable stop 20.

While other forms or constructions of roof for the heating chamber may be employed, it is preferred that it be made in sections 3ª resting at their edges on the tops of the inner and outer side walls of the furnace, as shown in Figs. 1, 2, 4 and 7. These sections which consist of metal frames and f"ings or body portions formed of fire clay or other refractory material and can be readily removed independently one of the other, are preferably made of a length in the direction of the circumference of the furnace, not less than the lengths of the hearth sections, thereby permitting the removal of hearth sections at any point.

The inner and outer walls of the heating chamber are of approximately the same height along that portion of the heating chamber where the highest heat is required, i. e., at the discharging end and for a suitable distance in advance of the discharging door, but from this portion of the furnace where the heating of the articles is completed, the heating chamber is so constructed as to prevent any short circuiting of the heat and products of combustion as they flow toward the stack. As will be readily understood by those skilled in the art, the pull of the stack will by reason of the circular shape of the heating chamber, cause the heat and products of combustion to move away from the outer wall and flow along closely adjacent to the inner wall so that portions of the heating chamber adjacent to its outer circumference will be at a much lower temperature than portions adjacent to its inner wall and hence articles extending transversely of the heating chamber will not be uniformly and equally heated.

In order to prevent such a short circuiting of the heat and products of combustion, the inner wall 1 of the heating chamber is made substantially lower than the outer wall from a point adjacent to the point of maximum heat of the furnace, so that the roof or cover of the furnace will incline downwardly from the outer to the inner wall. By reason of this inclination of the roof or cover, as shown in Figs. 7 and 13, the gases will meet more resistance following around the inner wall and will flow outwardly toward the outer wall where they will be more free to expand and by properly proportioning the relative heights of the inner and outer walls there will be a substantially equal transverse distribution of the heat as it flows around to the point of discharge through the stack which is connected to the charging end of the heating chamber through a bustle pipe 32.

Figure 13:
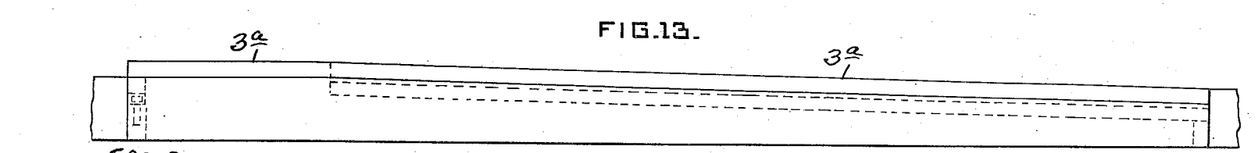
Fig. 13 is a diagrammatic view showing a plane development of the furnace to illustrate the gradually increasing height of the furnace, from the charging to the discharging end.

In order to retard the flow of the hot gases toward the discharge or stack end of the furnace the height of the heating chamber is made progressively lower from the point of maximum heat to the point of connection with the stack as shown in Fig. 13. It will be readily understood by those skilled in the art that working conditions will control the relative heights of the inner and outer walls and also the gradual lowering of the top of the furnace toward the point of connection with the stack.

Figure 1:
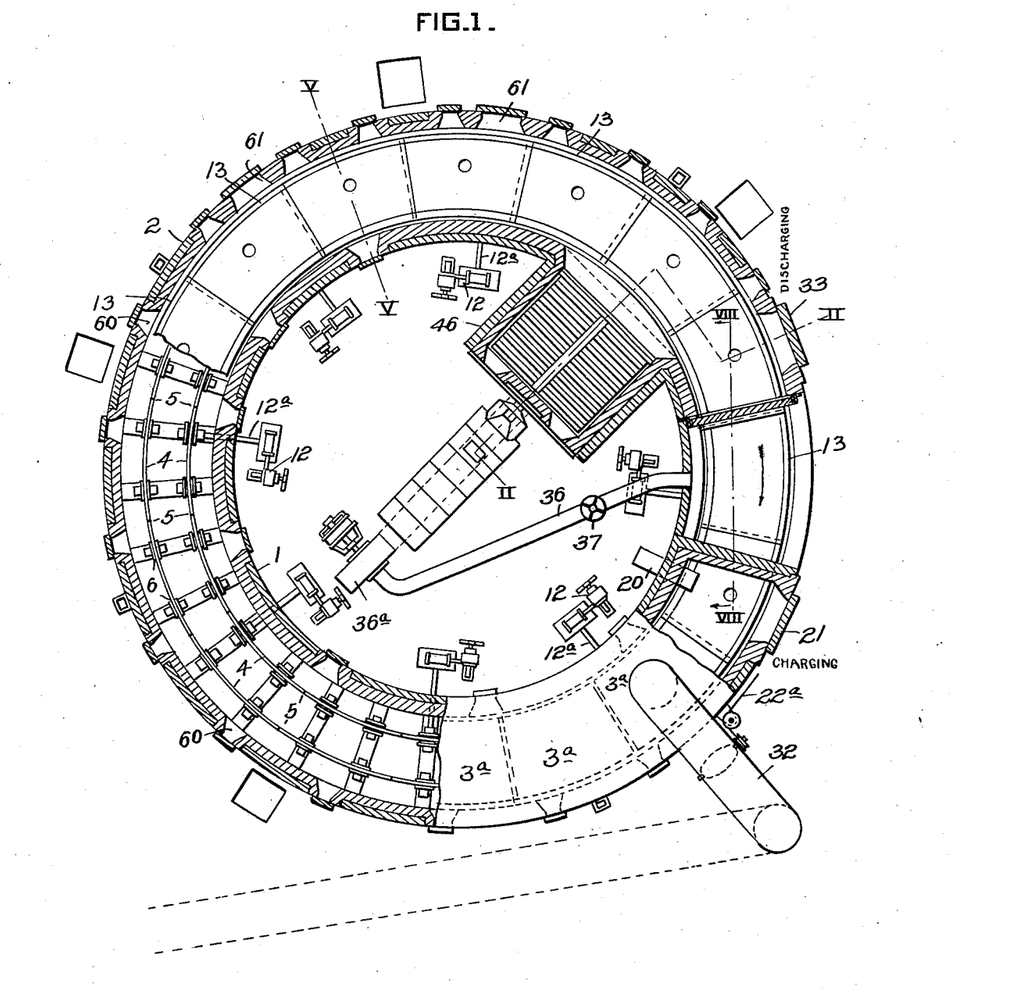
Figure 1 is a plan view partly in section of our improved continuous heating furnace.
Figure 10:
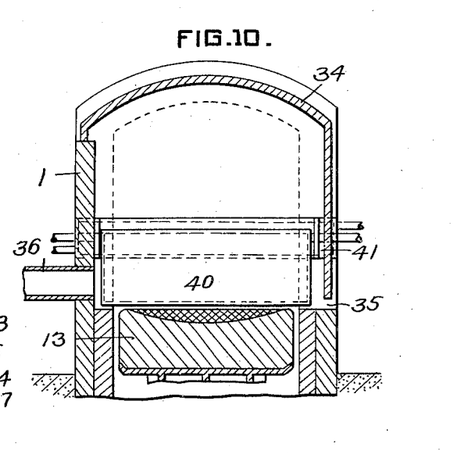
Fig. 10 is a sectional view on the same plane illustrating a modification in the construction of that part of the furnace.
Figure 11:
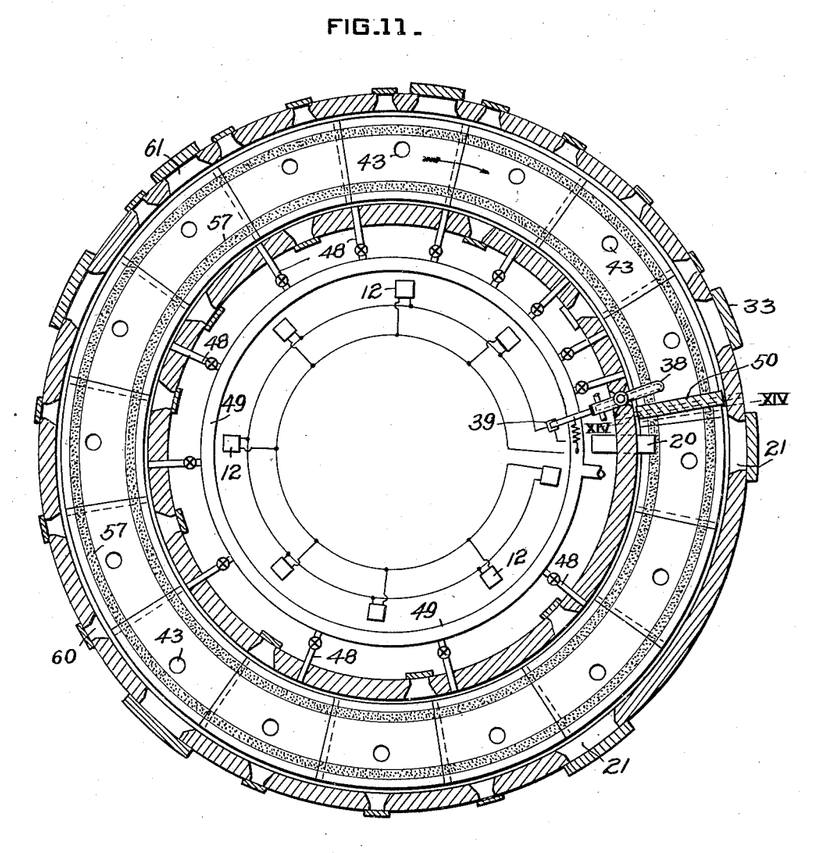
Fig. 11 is a sectional plane showing the connections to the heating furnace whereby gaseous or liquid fuel may be employed for heating purposes.

The moving bed or hearth of the furnace is continuous but the points of high and low temperatures in the heating chamber are separated at a point intermediate the charging door 21 and the discharging door 33. While this separation of the hot and relatively cool portions may be effected by a transverse wall 50, as shown in Fig. 11, it will be desirable in many cases to provide a gap or open space between such portions, which is preferably made of a length slightly greater than the lengths of the hearth sections forming the moving hearth, thus affording opportunity for repairing or replacing the sections when necessary as shown in Fig. 1. The inner wall of the heating chamber may be extended across this gap or open space, but it is preferred that the outer wall should not extend above the level of the hearth. In addition to permitting access to the hearth, this gap will permit of a certain cooling of the hearth as is desirable when repairs are necessary and also when treating certain kinds of steel, as practice has shown that when articles formed of such steel are placed in contact with highly heated surfaces, the local heating will cause cracks in the surface. In case the mere exposure of the hearth in passing from the highly heated end of the furnace into the charging end does not effect such a cooling of the hearth as will prevent injurious local heating as above stated, a hood 34 may be arranged over the gap as shown in Fig. 10. The front wall of this hood does not extend to the top of the foundation of the outer wall, so that a slot 35 is formed for the entrance of air about the level of the hearth. A fan or blower is connected to the hooded gap by a pipe 36. When stoking mechanism is employed for feeding fuel to the furnace as shown in Fig. 1, the pipe 36 may be connected to the inlet of the fan or blower 36ᵃ forming part of the stoking mechanism. In heating ingots formed of ordinary steels, the ingots may be charged into the hot hearth without injurious effects and hence a cooling of the hearth prior to charging the ingots is not only unnecessary but in most cases it would be preferable to prevent loss of heat. In such cases the front wall of the hood 34 should be extended sufficiently to prevent the entrance of cold air into the gap, and the valve 37 in the pipe 36 is closed or the connection between the exhaust fan and the gap omitted.

In order to prevent articles being carried beyond the discharging door suitable means are employed for stopping the movement of the hearth as soon as an article is brought into discharging position. A convenient means to this end is shown in Fig. 11 and consists of an arm 38 movably supported in the path of movement of the articles and in such relation to the discharge door, that as the article reaches discharge position it will shift said arm which is connected to means controlling the operation of the motors employed for moving the hearth, as for example a switch 39 arranged in the circuit between the motors and the generator supplying current thereto, and thereby stop further movement of the bed.

In order to prevent injury to the end of the furnace in case the hearth control fails to operate the end wall of the furnace is formed by a door 40 provided with trunnions 41 at its upper end, said trunnions being mounted in bearings on the side walls of the furnace, as shown in Figs. 1, 8, 9 and 10, so that when the hearth continues to advance the door will swing out permitting the articles to pass out into the gap between the ends of the furnace.

Figure 12:
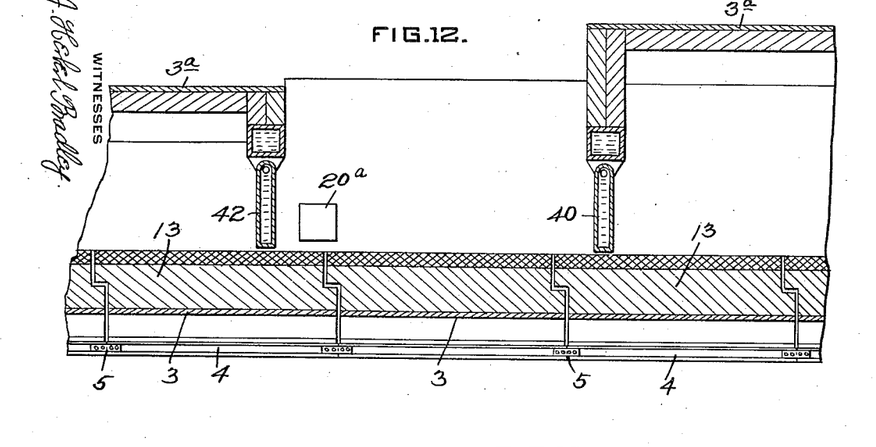
Fig. 12 is a view similar to Fig. 8 showing the charging end of the furnace provided with an inwardly swinging door.

In lieu of a fixed or permanent wall at the charging end of the furnace, a door 42 pivotally mounted as in the case of the door 40 may be employed for closing the charging end, and hence if desired articles to be heated may be placed on the portion of the hearth in the gap and will be carried into the furnace by the movement of the hearth. In case the gap is utilized as a point for placing articles on the hearth, a stop device 20ª, similar to the stop 20 should be employed for properly locating the articles on the hearth, as shown in Fig. 12. In case any of the articles have not been sufficiently heated when brought to or approximately to the point of discharge, the hearth may be stopped, or its movement be reversed, the swinging doors at the end of the heating chamber permitting of such reversal without removing any articles from the hearth.

In order to prevent the accumulation of slag on the hearth, holes 43 are formed through the refractory blocks 13 and the cushion material forming the beds of the hearth sections and pots 44 for their reception of the slag are arranged in pockets 45 in the cars. At suitable points around the furnace openings are formed in the outer wall for the removal of a charged pot and the insertion of an empty one.

Figure 2:
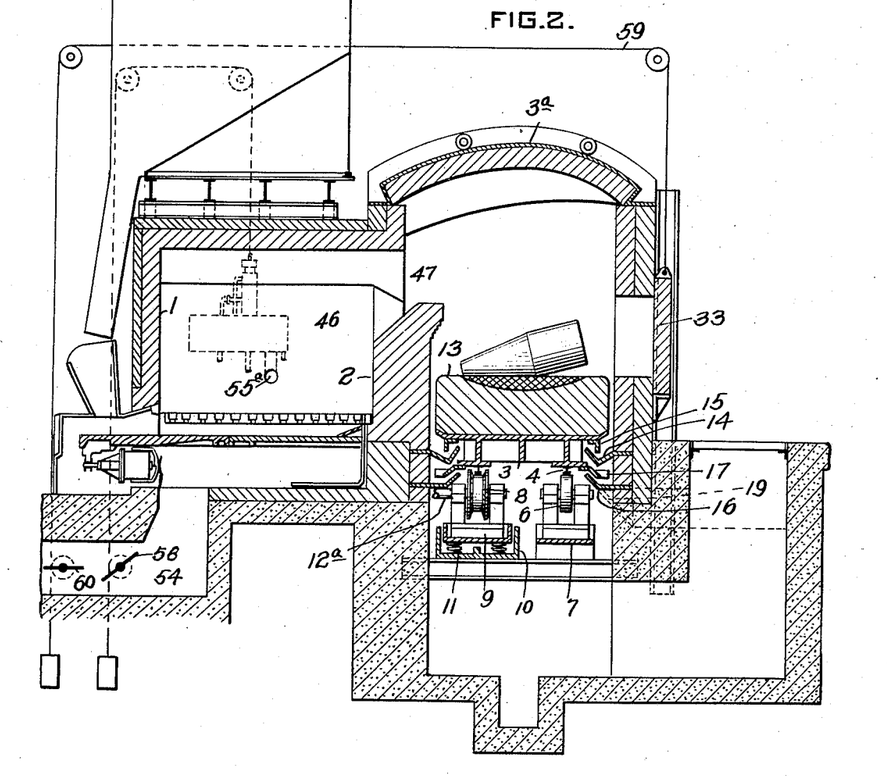
Fig. 2 is a sectional elevation on a plane indicated by the line II—II, Fig. 1.

Any suitable means known in the art may be employed for heating the furnace, as for example, in Figs. 1 and 2 is shown apparatus for the utilization of solid fuel as coal and consists of a combustion chamber or fire box 46 connected by a port 47 to the heating chamber at a point adjacent to the discharge end of the heating chamber or the portion whence the greatest heat is desired. This fire box is preferably located in the area inclosed by the heating chamber, and while the fuel may be manually charged into the firebox it is preferred to employ a suitable form of stoking mechanism as indicated in Figs. 1 and 2 if preferred gases or liquid fuel may be employed for heating purposes. In such cases a plurality of valved fuel inlets 48 extend into the heating chamber from a supply pipe 49 preferably arranged in the space or area inclosed by the heating chamber as shown in Fig. 11; as indicated the fuel inlets are arranged with reference to the temperature required in the different portions of the heating chamber, that is to say that the fuel inlets are arranged comparatively close together when the highest heat is required and spaced farther and farther apart toward the charging end of the heating chamber.

Figure 14:
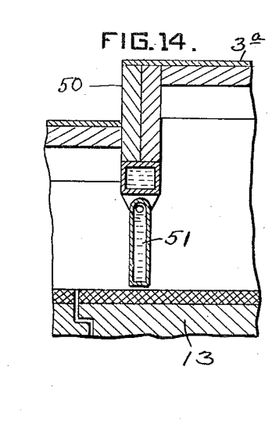
Fig. 14 is a transverse section on the line XIV—XIV, Fig. 11.

As hereinbefore stated the charging and discharging ends or portions may be separated by a transverse partition or wall 50 which as shown in Fig. 11, would extend down to within such distance of the surface of the continuous hearth as will prevent any material flow of heat from the highly heated end into the charging end but will not interfere with the movement of the hearth. If desired, this partition may be formed by a water cooled swinging door 51 as shown in Fig. 14.

Although there will be some oxidation of the articles from the time they are charged into the furnace, such oxidation will not become excessive until the articles have been raised to a certain known temperature, and while combustion for heating is so regulated as to produce an unoxidizing atmosphere within the furnace, it is desirable to prevent the inflow of air through any openings in the walls of the furnace, and hence provision is made for maintaining within the furnace from the discharging end around to a point where oxidation becomes excessive a pressure in excess of the atmospheric pressure. This can be readily effected by providing what is known as a furnace machine shown in dotted lines in Fig. 2, preferably of the type or construction shown in Letters Patent No. 1,247,215 dated Nov. 20th, 1917, connected by a pipe 55 to a firebox or other portion of the furnace in such manner that as the pressure in the portion of the furnace to which the machine is connected rises and falls, there will be a movement of the lever carrying the inverted cups, as shown in said patent, into which the pressure pipe 55 discharges, so that as the pressure varies, this lever will be shifted and through suitable connections, such as a rope passing around suitable guide pulleys to a valve 56 located in the conduit 54 employed for conducting air under pressure to the fire box. As the pressure rises in the fire box or heating chamber above that desired, this valve will be closed and on a drop of pressure the valve will be opened so that at all times a pressure greater than atmospheric pressure will be maintained in the portion of the heating chamber where oxidation is likely to occur to an undesirable extent.

As a pressure greater than atmospheric pressure will be maintained in the portion of the furnace adjacent to the discharging door, provision should be made for reducing such internal pressure when opening such door. This can be conveniently effected by so connecting the discharging door, as by a rope 59 passing over guide pulleys to a damper 60 arranged in the conduit 54 conducting air under pressure to the fire box that when the door is raised for the removal of articles, said valve will be closed and opened when the door is closed.

As it may at times be desirable to have the heat circulate entirely around the article being heated, spaced ridges 57 are provided for supporting the articles above the surface of the hearth. While these ridges may be formed in any desired manner, it is preferred that they should be formed of disintegrated dolomite, which is placed in hoppers 58 preferably located at the charging end of the heating chamber and provided with valved spouts 59 projecting through the end wall of the furnace as shown in Figs. 4 and 8. By suitably regulating the flow of dolomite or other suitable material through these spouts, ridges of any desired dimensions will be formed along the hearth for supporting the articles.

It is characteristic of continuous heating furnaces, i. e., heating furnaces in which the article is charged at a comparatively cool point and moved along through progressively more highly heated portions, now in use that pressure is applied to the last charged article and transmitted from article to article. As the articles are in contact with adjoining articles, such furnaces cannot be employed to impart a "wash heat." In using the furnace described and claimed herein the articles can and preferably are arranged on the moving hearth a substantial distance apart and hence by a proper regulation of the heat and the movement of the hearth, the article can be given a "wash heat" or heated uniformly throughout.

It is preferred that peep openings 60 should be formed at suitable intervals in the side walls of the furnace and also openings 61 of sufficient size to permit of the removal of articles when necessary.

We claim herein as our invention:

1. A heating furnace having in combination an annular chamber having a length less than 360 degrees and having closed ends and provided with charging and discharging doors adjacent to the respective ends an annular movable hearth for supporting the articles to be heated means for heating the furnace adjacent to the discharge end of the chamber, a connection from the furnace to the stack adjacent to the charging end of the chamber and means for moving the hearth in a direction opposite the flow of heat and products of combustion.

2. A heating furnace having in combination an annular heating chamber having a length less than 360 degrees and having closed ends, an annular hearth movable in said chamber, a connection from the furnace to the stack adjacent to one end of the chamber, means for heating the furnace adjacent to the opposite end of the chamber and adapted to maintain progressively increasing heat from the stack connection to a point adjacent to the opening through which the articles are removed from the furnace, and means for effecting a transverse equalization of the heating chamber.

3. A heating furnace having in combination an annular heating chamber having a length less than 360 degrees and having closed ends, a roof or crown supported by the side walls of the chamber and having a portion inclining downward from the outer to the inner wall, means adjacent to the charging end for heating said furnace, a connection from the furnace to a stack adjacent to the discharging end of the furnace, a hearth and means for shifting the hearth in the reverse direction to the movement of products of combustion through the chamber.

4. A heating furnace having in combination an annular heating chamber, having a length less than 360 degrees and having closed ends and provided with charging and discharging doors adjacent to the respective ends, means for heating said chamber, a connection from the furnace to a stack adjacent to the discharge opening of the furnace, a movable hearth having a length equal to 360 degrees, thereof or crown of the chamber being inclined downwardly from the charging end of the furnace to the discharging end and from the outer to the inner side walls of the chamber.

5. A furnace having in combination an annular heating chamber having a length less than 360 degrees and having closed ends and provided with charging and discharging doors adjacent to the respective ends, a movable hearth having a length equal to 360 degrees, means for shifting said hearth, a connection from the heating chamber to a stack adjacent to the charging end of the furnace and means for maintaining a progressively uniform increasing heat from the stack connection toward the discharging end of the heating chamber.

6. A furnace having in combination a heating chamber having its side walls formed on arcs of circles and having a length less than 360 degrees and having normally closed ends, a movable hearth of a length equal to 360 degrees and consisting of separable sections, the length of the sections being approximately equal to the distance between the ends of the heating chamber and means for moving the hearth.

7. A heating chamber having in combination therewith a movable charging door, a stop for determining the position of an article on the hearth of the furnace, means for moving the stop to operative position when the door is opened and for withdrawing the stop when the door is closed.

8. A heating furnace having in combination therewith a movable charging door and a stop movable into the furnace for determining the position of an article on the hearth of the furnace, said stop being movable forward and back by the door in its opening and closing movements.

9. A furnace having its side walls formed on arcs of circles in combination with a movable hearth consisting of separable and removable sections and a plurality of driven rollers for supporting and moving the hearth.

10. A furnace having its side walls formed on arcs of circles in combination with a movable hearth consisting of detachably connected rail sections, frames carried by such sections, and blocks of refractory material supported by the frames and a plurality of driven rollers for supporting and moving the hearth.

11. A furnace having in combination a heating chamber having its side walls formed on arcs of circles having a length less than 360 degrees, a movable hearth having a length equal to 360 degrees, means for moving the hearth and means for regulating the loss of heat of the hearth while moving between the ends of the heating chamber.

12. A furnace having in combination a heating chamber having its side walls formed on arcs of circles, a movable hearth having its bed formed of refractory material, said bed being provided with openings for the escape of slag and removable slag pots carried by the hearth.

13. A furnace having in combination a heating chamber having its side walls formed on arcs of circles and having openings for the charging and discharging of articles, a connection to a stack from a point adjacent to the charging opening, means for maintaining a temperature progressively increasing from the stack connection, means for preventing a short circuiting of the heat and products of combustion.

14. A continuous furnace having in combination a heating chamber having connection to a stack, means for maintaining a progressively increasing heat from the stack connection, and means for maintaining a pressure above atmospheric pressure from the point of maximum heat to a point where the articles attain a temperature at which an undesirable degree of oxidation will occur.

15. A continuous furnace having in combination a heating chamber having a connection to a stack, means for maintaining a progressively increasing heat from the stack connection toward the discharging end of the heating chamber, and means controllable by the pressure in the furnace for maintaining a pressure above atmospheric pressure from the point of maximum heat to a point where the articles attain a temperature at which an undesirable degree of oxidation will occur.

16. A heating furnace having charging and discharging doors in combination with a movable hearth, means for shifting the hearth to advance material along the furnace and automatic means for stopping the movement of the hearth when an article carried thereby has been moved to discharging position.

17. A heating furnace having charging and discharging doors in combination with a movable hearth, means for shifting the hearth to advance material along the furnace and means adapted to be shifted by an article carried by the hearth for checking the movement of the latter.

18. A heating furnace having side walls formed on arcs of circles in combination with an annular hearth arranged between said walls, means for shifting said hearth to advance articles along the furnace and means for stopping the movement of the hearth when an article carried thereby has been moved to a predetermined point.

19. A heating furnace having side walls formed on arcs of circles in combination with an annular hearth arranged between said walls, means for shifting said hearth to advance articles thereon along the furnace and means projecting into the path of movement of an article carried by the hearth for stopping the movement of the hearth.

In testimony whereof we have hereunto set our hands.

GEORGE J. HAGAN.
JOHN M. HOPWOOD.